Sept. 26, 1967

M. G. TOWNSLEY 3,343,957

RECORD CARD AND MEANS FOR ADDING IMAGES
BY DIFFUSION TRANSFER TECHNIQUE

Filed Jan. 6, 1964

INVENTOR.
Malcolm G. Townsley
BY
Hill, Sherman, Meroni, Gross & Simpson
ATTORNEYS United States Patent Office 3,343,957

Patented Sept. 26, 1967

3,343,957

RECORD CARD AND MEANS FOR ADDING IMAGES BY DIFFUSION TRANSFER TECHNIQUE

Malcolm G. Townsley, Park Ridge, Ill., assignor to Bell & Howell Company, Chicago, Ill., a corporation of Illinois Filed Jan. 6, 1964, Ser. No. 335,919
2 Claims. (Cl. 96—29)

ABSTRACT OF THE DISCLOSURE

Means for cumulatively storing information on a record medium employing a medium divided into an area arranged to receive punch information and another area having a plurality of image receiving areas thereon, the image receiving areas having coding positions, and being treated to provide receptive surfaces for image transfer by the diffusion transfer technique.

The present invention relates to an improved system for information storage and retrieval. The invention is specifically directed to the addition of images of document content or other information to update previously stored information as, for example, on the surface of an opaque or transparent record medium such as a business machine card or a film strip or a roll of film.

Numerous instances arise in the field of image storage and retrieval where it is desired to store associated images in physical proximity to each other, even though the originals from which the images are made may have originated at different times or places, and become available for recording at different times. When micro-images are used, it is convenient to place multiple images on a single carrier such as a card, film or sheet of transparent material. When new information or new documents are generated or become available at a later time than the time of original recording, it is very desirable to be able to add their images to the carrier which already contains images of the associated documents. One specific example occurs in the filing systems employed by insurance companies. The original file on an insured is made up at the time of the issuing of the policy, but from time to time it becomes necessary to add more information to the file such as the processing of a claim or a subsequent medical examination. Heretofore, this additional information could not conveniently be incorporated into the existing record system.

In the present invention, there is provided a system whereby reduced sized images of various documents, or any information for that matter, may be produced on the surface of an opaque or transparent record medium, such as an ordinary business machine card. This permanent reduced sized copy can then be used for immediate or future reference while the original reference material may remain in a central file, if desired, for use by other persons, or it may be discarded and the more compact file of reduced images retained as the primary record.

When it becomes necessary to add information to the file, the record card is retrieved systematically and selectively whereupon a micro-image of the information to be added is placed on the record card and may be individually coded in order to systemize the information and retrieval system even further. Once reduced to micro-image form, the techniques used in conventional microfilm systems can be used in reading the images, and in obtaining hard copy blow-backs from the micro-images.

In one specific example of the general principles of the present invention, the document content or other original material to be copied is brought to a machine placed on an exposure platen. An appropriate card adapted to receive the micro-image is positioned over a corresponding reference window. Locating means are provided for aligning the card and for pre-determining the location at which the micro-image is to be placed on the card, for example, at a selected vertical column position in a selected horizontal row. The machine is then set into operation and within a short time, the card is returned bearing a completed micro-image of the original at the specifically selected aligned position. The cycle is repeated with each new document image being placed in another image position on the card until all document images appropriate to the selected card have been copied to the card. At a reduction of 12 to 1, a single 3 x 5 card can accommodate eighteen separate pages of documentary information normally appearing on a document sized 8½ x 11 inches. When opaque cards are used, both sides of the cards can be utilized, thereby doubling the capacity of the image cards.

The present invention involves the transfer of such images to a record medium by means of a diffusion transfer technique. The diffusion transfer technique is a well known photo-mechanical printing process which provides a permanent image on an inert printing surface and lends itself very well to the system of record storage here contemplated.

One of the objects of the present invention is to provide a method for compiling film record media for information storage and retrieval whereby additional documentary information can be applied to the record from time to time as conditions make it advisable to supplement the original information.

Another object of the invention is to provide a coded record card of the type used in business machines, and including coded information applied to the card originally, and documentary information added to the card at subsequent times by the diffusion transfer photographic technique.

Still another object of the invention is to provide an improved record media for information storage and retrieval which is capable of accepting transfer images by the diffusion technique without special preconditioning being required.

Other objects and features of the present invention will be apparent to those skilled in the art from reference to the accompanying sheets of drawings which illustrate a preferred embodiment of the invention.

Figures 1, 2, 3, 4:
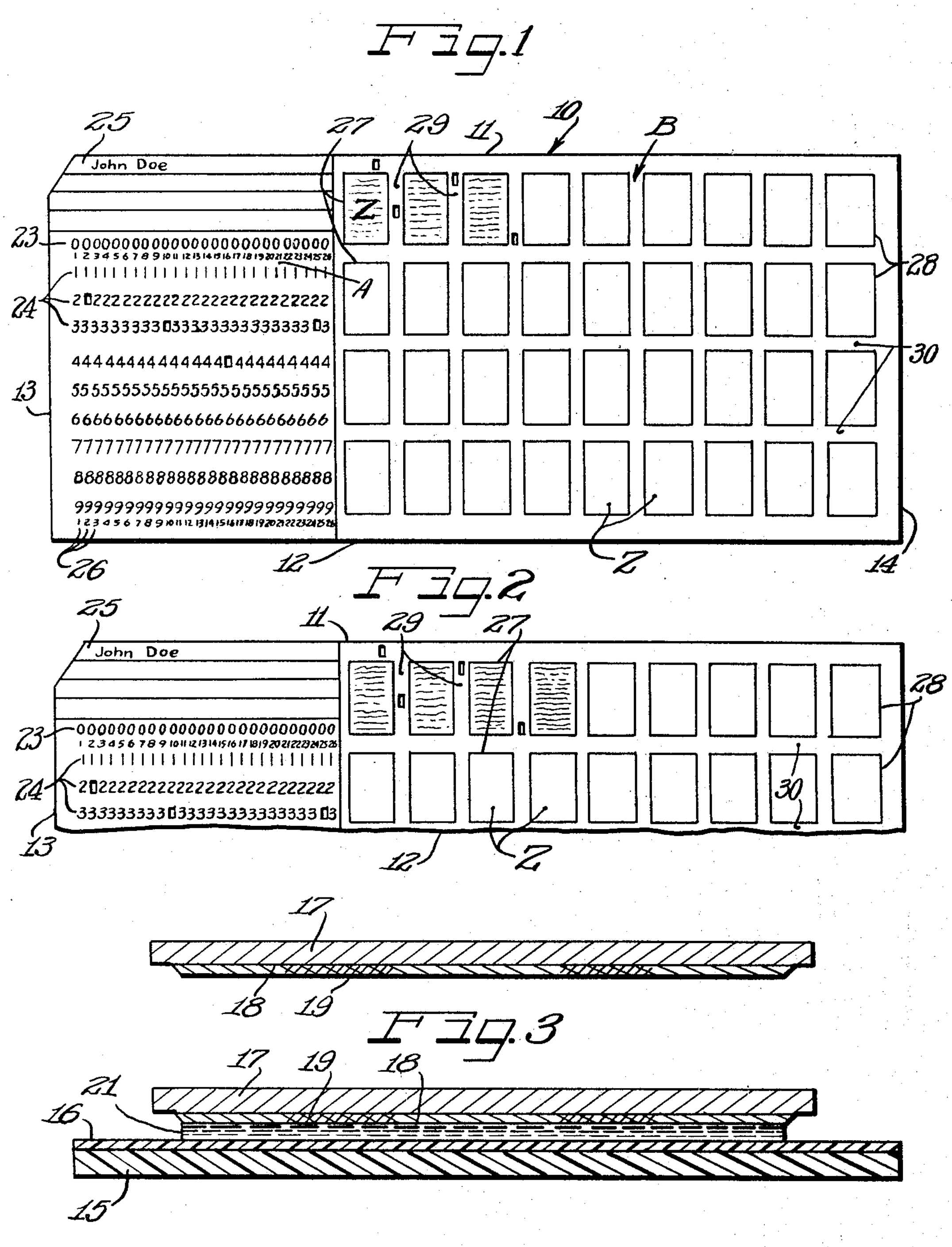
FIGURE 1 is a face view of a typical card constructed according to the present invention and illustrating the manner in which the information is stored initially on the card.
FIGURE 2 is a view similar to FIGURE 1, but illustrating the manner in which additional documentary information is incorporated into the card as it becomes necessary or desirable to do so.
FIGURE 3 is a greatly enlarged cross-sectional view of a photosensitive film from which an image can be transferred.
FIGURE 4 is a greatly enlarged cross-sectional view illustrating the manner in which the image is transferred from film of FIGURE 3 to the image receiving card of the present invention.

In accordance with the present invention, an improved information storage and retrieval system is provided by utilizing a unitized tab card having plural independent discrete image zones disposed in a regular arrangement for the reception of images by the diffusion transfer technique. Such cards, for example, may be punched cards, ordinary file cards with eye readable index indications, edge notched cards, and/or other types of cards used in filing and retrieval systems such as a magnetic system with edge notches. The cards may also include other intelligence in the form of "yes-no" means such as spots or pigmented areas or punch positions adjoining each column of image zones for effecting horizontal coding of the respective image zones and further including identifiable positions adjoining each row of image zones for effecting vertical coding of the respective image zones. Space is also provided on the card which may be devoted to intelligence coded information, for example, for purposes of general identification. It will be understood that the principles of the present invention are also applicable to other record media such as film transparencies, film strips and rolls of film.

The card illustrated in FIGURES 1 and 2 is denoted generally at reference numeral 10 and consists of a generally rectangular sheet form member having a major longitudinal dimension through which extends an upper edge 11 and a lower edge 12, and a minor dimension through which extends a side edge 13 and a side edge 14.

The card is divided along the length of its major longitudinal dimension into a minor area indicated at A and a major area indicated at B. These major and minor areas can be placed selectively, for example, with the minor area at the center of the card and the major area on different sides thereof. The minor area A is intended to be devoted to intelligence information of a general identification character, whether punched or otherwise coded, while the major area B in accordance with the present invention is adapted to receive document information in the form of plural images by the diffusion transfer technique, the images being disposed in sequenced groups disposed in vertical columns and horizontal rows and separated by identifiable stations forming intelligence means or "yes-no" means, or some sensible coding signals.

While the present invention is applicable to an opaque card, it is also contemplated that the card may be made of a transparent film material, thereby providing a film transparency.

A suitable card structure has been illustrated in FIGURE 4 in conjunction with its use in the diffusion transfer technique. The card includes a transparent film base 15 having a coating 16 thereon which includes a material capable of fogging a photosensitive silver halide. The carrier material for the coating 16 may consist, for example, of gelatin and the fogging agent may be material such as colloidal silver, colloidal forms of sulphur, silver sulfite, hypophosphites, stannous chloride, and organic sulphur compounds capable of splitting off sulphur in the form of a bivalent ion such as thiosinamine. Sodium thiosulphate also acts as a fogging agent by promoting the reduction of halides without requiring the action of light, and is also a silver halide solvent.

The documentary data to be transferred to the card is initially provided from a photosensitive material illustrated in FIGURE 3. This structure includes a support 17 on which a light sensitive layer 18 carrying a photosensitive silver halide emulsion is applied. The areas of the emulsion 18 which have been exposed to thereby form a latent image are indicated at reference numeral 19 of the drawings.

The exposed photosensitive material shown at FIGURE 3 is brought into contact with the image receiving material consisting of the base 15 and the coating 16 containing the fogging agent, while a layer of developing solution 21 is applied at the interface between the two layers. The developing solution is capable of producing development of the latent image in the photosensitive material, to produce an image composed of developed silver in the photosensitive layer. The developing solution also includes a solvent for the silver halide material which acts more slowly than the developer component, to dissolve the unreacted silver halide salt and permit it to diffuse across the interface between the two surfaces and into the image receiving layer. In the image receiving layer, the silver salt is fogged and thus rendered capable of being developed by the fogging agent in the image receiving layer. This fogged silver halide salt is then developed to metallic silver in the receiving layer.

Suitable silver halide solvents include those which are contained in usual photographic developers such as sodium sulfite. As mentioned previously, sodium thiosulphate is also a silver halide solvent in addition to being a fogging agent.

The developing agent included in the solution may be any of the common developers such as paramethylamido hydroxybenzene-hydroquinone.

When the reaction is complete and the silver salt which was not originally exposed in the photosensitive layer has been diffused into the image receiver layer and there developed to a useful density, the photosensitive layer and its support are stripped away, taking away with them most of the developer solution, and discarded. The residual developing agents may be rinsed or wiped away, or otherwise made inactive, and the image receiving layer then has a permanent copy of the original image impressed upon it.

Returning now to FIGURES 1 and 2, it will be seen that the card face is provided with index calibrations by means of which a code of information may be placed on the face of the card. Plural horizontal rows are established for effecting vertical coding of the card as illustrated by the so-called zero row identified at reference numeral 23 and the successively numbered rows 1 through 9 respectively shown at reference numeral 24. The face of the card is also indexed in vertical columns and in the specific illustration of FIGURES 1 and 2, eighty separate vertical index locations are disposed across the face of the card, the first twenty six of them being illustrated at reference numeral 26.

The major area B is divided into plural independent discrete image zones each shown at Z and being disposed in multiple columns extending vertically as illustrated at reference numeral 27 and in multiple rows extending horizontally as at 28. In the form of the invention illustrated, there are nine vertical columns 27 and four horizontal rows 28, thereby providing in the major area B thirty-six separate image zones. The separate image zones Z are spaced from one another to provide plural coding positions corresponding to the indexed calibrations disposed between the columns as shown at 29 and disposed between the rows as shown at 30. Accordingly, by virtue of the coding position locations, each image zone Z may be independently intellgence coded within the body of the card which itself may be intelligence coded for general identification purposes in the minor area A.

It should be understood that the "discrete image receiving zones" referred to herein are so described for convenience in description, and it is not necessary that the image receiving zones differ in any way from the general surface of the card or sheet. The zones are selected only on the basis of a chosen geometry of image location on the card or sheet.

The image zones are located in alignment with the index calibrations prescribed by the horizontal and vertical index rows in columns. While the card illustrated in FIGURES 1 and 2 shows four rows of zones Z, it is contemplated that the rows and columns of image zone Z could be aligned so that the index calibration rows and columns would extend between the frames. For example, in a card having three rows of image zone Z, the rows of images could be centered on the "0," "4" and "8" lines, while the "No. 12" line (located above the "0" line) and the "No. 2" and "No. 6" lines would be reserved for intelligence coding to code each image zone independently.

From the foregoing, it will be apparent that the present invention provides a method of cumulatively storing information on copy media suitable for information storage and retrieval systems where initial information can be recorded on the card not only in code form, but also in the form of legible information as contained on a heading portion 25, which information may be typed or printed. When it is desired to update the card or fill in missing information, it will be understood that the card 10 is retrieved from the information storage and retrieval system systematically and selectively. Additional images are then added, the images containing document content or other intelligence, and the images are located in the localized discrete image zones by the diffusion transfer photographic technique. Since the images have been reduced to micro-image size, the techniques normal to conventional microfilm systems can then be used in reading the images and in obtaining hard copy blow-backs from the micro-images.

It should be understood that various modifications can be made to the described embodiments without departing from the scope of the present invention.

I claim as my invention:

1. A coded record medium of the type used in information storage and retrieval systems comprising a sheet form base, said base being divided into an area arranged to receive punch information and another area having a plurality of image receiving areas thereon, said image receiving areas being arranged in spaced relation in rows and columns and each including an inert printing surface having a fogging agent for silver halide incorporated therein, said base also having coding positions between said rows and said columns for effecting separate intelligence coding of each of said image receiving areas.

2. The method of cumulatively storing information on a card which comprises providing a card having an area arranged to receive punch information and another area having a plurality of image receiving areas thereon, said image receiving areas being arranged in spaced relation in rows and columns and each including an inert printing surface having a fogging agent for silver halide incorporated therein, selectively retrieving the card, bringing an exposed photographic silver halide surface into close proximity with a selected image receiving area on said card, interposing a developer solution and a silver halide solvent at the interface between the surfaces, and transferring the image from said exposed surface to said image receiving area on said card.

References Cited

UNITED STATES PATENTS

| | | | |
|---|---|---|---|
| 2,206,206 | 7/1940 | Smith | 96—43 |
| 2,500,421 | 3/1950 | Land | 96—87 X |
| 3,275,439 | 9/1966 | Battison | 96—41 |

OTHER REFERENCES

Crisis: How Can We Store Human Knowledge? Bell, Popular Mechanics, November 1962, pp. 104–110.

NORMAN G. TORCHIN, *Primary Examiner.*

R. E. MARTIN, *Assistant Examiner.*